Oct. 24, 1967        E. PLUMAT        3,348,937
SPOUT FOR THE DISCHARGE OF MOLTEN GLASS
Filed Sept. 5, 1963
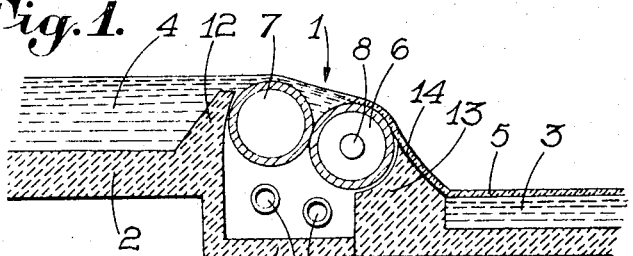
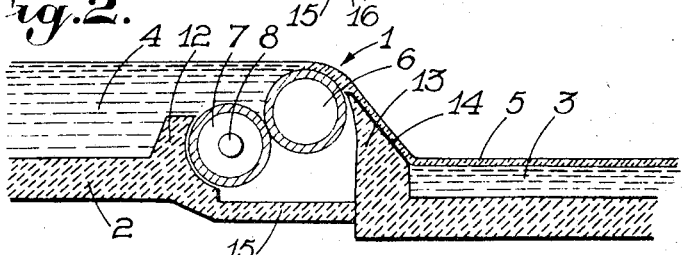
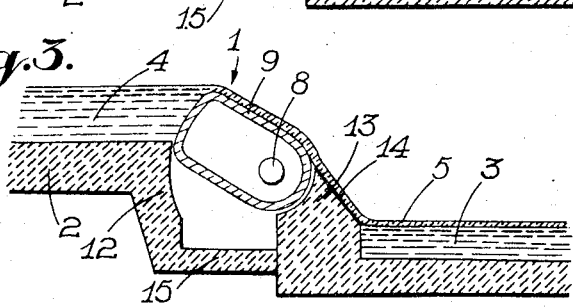
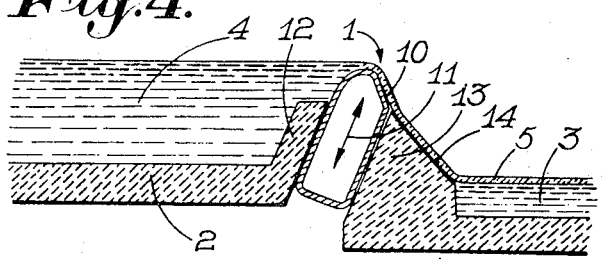
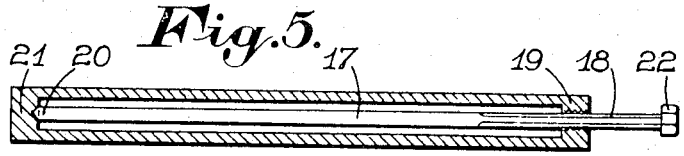
INVENTOR
EMILE PLUMAT
BY *Corey, Hart & Stemple*
ATTORNEYS

United States Patent Office 3,348,937
Patented Oct. 24, 1967

3,348,937
SPOUT FOR THE DISCHARGE OF
MOLTEN GLASS
Emile Plumat, Gilly, Belgium, assignor to Glaverbel,
Brussels, Belgium, a Belgian company
Filed Sept. 5, 1963, Ser. No. 306,867
Claims priority, application Luxembourg, Sept. 29, 1962,
42,438
8 Claims. (Cl. 65—333)

The invention relates to a spout for the discharge of the glass coming from the melting furnace and intended to be spread in the form of a sheet, for example on a bath of molten metal.

Usually, this spout is fixed and consists of a mass of refractory ceramic material which is subjected to abrasion and erosion by the molten glass. Particles may become detached therefrom and be carried along by the glass, with which they become mixed and thus cause defects which take the form of streaks and opaque spots in the cooled glass. In addition, the abrasion of the material of the spout ultimately modifies its level and the erosion causes irregularities therein which impede the normal flow of the layer of glass of the required, constant thickness over the entire extent of the spout.

When a fixed spout is employed, the adjustment of the installation is a delicate matter and reacts only with some time lag, the points of adjustment being a considerable distance apart, one of them being at the introduction of the glass batch into the melting furnace and the other at the drive of the glass ribbon entering the annealing gallery.

The spout for the discharge of molten glass according to the invention obviates the disadvantages due to abrasion and erosion of the material of the spout and makes it possible readily to adjust the flow of the molten glass over the spout and readily to modify the thickness of the layer for the purpose of adapting it to the programme of production and to the momentary conditions of the operation of the installation.

For this purpose, the spout comprises a movable portion by means of which the level of its crest can be modified. This movable portion preferably consists of a heat-resistant material which is inert to the molten glass, such as molybdenum or tungsten, or of a metal coated with a platinum sheet. It advantageously comprises at least one hollow bar.

In a first embodiment of the invention, the movable portion consists of two juxtaposed bars adapted to perform together a rotational movement about the longitudinal axis of one of the bars. In a second embodiment, it comprises a bar of oval cross-section adapted to perform a rotational movement about an eccentric longitudinal axis, and in a third embodiment it is formed of a bar adapted to be moved parallel to itself in a vertical plane or in a plane inclined in relation to the vertical, by a means such as jacks, cams or eccentrics.

When bars adapted to turn about a longitudinal axis are employed, the spout comprises fixed portions which are disposed upstream and downstream of the movable portion and have surfaces which are so shaped as to establish permanent contacts with the movable portion. When the latter is a bar moving parallel to itself, the fixed upstream and downstream portions comprise parallel planes between which the bar is adapted to slide.

In all the embodiments of the invention, the movable portion advantageously comprises in the cavity in the bar a means adapted to apply a longitudinal tension to the latter such as a jack, in order to prevent it from bending under the effect of the heat.

A number of embodiments of the invention are illustrated by way of example in the accompanying drawings.

FIGURES 1 to 3 diagrammatically illustrate in section three different spouts having a portion movable about an eccentric axis, FIGURE 4 diagrammatically illustrates in section a spout having a movable portion adapted to move parallel to itself, and FIGURE 5 is a longitudinal section through a spout bar comprising a jack for the application of tension.

According to FIGURES 1 to 4, the spout 1 comprising a movable portion is disposed between a channel, of which the base 2 is shown in the figures, and a plane and horizontal surface represented by way of example by a molten metal bath 3. The molten glass 4 comes from a glass furnace, passes over the spout and spreads out into the form of a sheet 5 on the plane horizontal surface in order to undergo thereon a thermal or other treatment. The movable portion of the spout consists of a heat-resistant material which is inert to the molten glass. Metals such as molybdenum or tungsten are perfectly suitable for this purpose, or again a heat-resistant metal coated with a platinum sheet.

In the embodiments illustrated in FIGURES 1 and 2, the movable portion consists of bars 6 and 7 which are held together along generatrices and adapted to perform together a rotational movement about the axis 8 of one of the bars, i.e. about the axis of the bar 6 in the case of FIGURE 1, and about the axis of the bar 7 in the case of FIGURE 2. In the embodiment illustrated in FIGURE 3, the movable portion consists of a single bar 9 of oval cross-section which comprises at its ends cylindrical surfaces centered on the eccentric axis of rotation 8. In the embodiment illustrated in FIGURE 4, the movable portion is a bar 10 which can be moved parallel to itself in the direction of the double arrow 11 by means not shown in the drawing, such as jacks, cams or eccentrics.

Upstream and downstream of the movable portion are provided fixed portions 12 and 13 of refractory ceramic material, which possess on the side of the movable portion curved surfaces in the form of arcs of circles centered on the axis of rotation 8 of the movable portion (FIGURES 1 to 3), so as to ensure fluid-tightness between the movable portion and the fixed portions. In the case of FIGURE 4, the fixed portions 12 and 13 possess plane, parallel faces, between which the movable portion 10 slides. Since the glass sheet flows over the fixed portion 13 before reaching the molten metal bath 3, the surface of this portion is preferably covered with a sheet 14 advantageously consisting of the same metal as that employed for the movable portion.

The space below the movable portion is closed by a base member 15 connecting the fixed portions 12 and 13 upstream and downstream of the movable portion. If necessary, this space may be provided with heating means such as burners 16 (FIGURE 1) or electric resistors, in order to prevent undesirable cooling of the molten glass during its passage over the spout.

The bars which constitute the movable portion tend to bend under the effect of the high temperature to which they are exposed, and it is therefore desirable to provide in their cavities a jack formed of a rod 17 (FIGURE 5), of which the screwthreaded portion 18 extends through the tapped end 19 of the bar, and of which the end 20 bears against the end 21 of the bar. Tension is applied to the latter by actuation of the head 22 by means of an appropriate key.

Of course, the invention is not limited to the embodiments which have been described and illustrated by way of example, and modifications may be made thereto without departing from its scope.

I claim:
1. Apparatus for forming sheet glass, comprising a container for a bath of molten glass having a sheet forming spout through which the molten glass is discharged from the bath to a lower level below the surface level of the bath, said sheet forming spout including transversely extending elongated means forming a barrier to the flow of the molten glass through the spout and having a first glass sheet forming surface constituting a crest over which the molten glass flows from the bath to said lower level, a second inclined fixed glass sheet forming surface located between said first sheet forming surface and said lower level and forming a continuation of said first sheet forming surface, means for adjustably moving said elongated means to enable said first surface thereof to be displaced relative to said second fixed surface to modify the level of the crest formed by said first surface, and a pair of spaced fixed transverse portions disposed upstream and downstream of said elongated means, said elongated means spanning the space between said fixed transverse portions and the latter having opposed surfaces formed to remain in coactable fluid-tight sealing relation with exterior surface portions of said elongated means during the adjusting movements of said elongated means therebetween, said second inclined fixed sheet forming surface being provided on said downstream fixed transverse portion.

2. Apparatus as defined in claim 1, in which said first glass sheet forming surface of said elongated means is provided on a hollow member constituted of a heat-resistant metal that is inert to molten glass.

3. Apparatus as defined in claim 1, in which said adjustable means comprises means pivotally supporting said elongated means on one of said transverse portions for movement about an eccentric longitudinal axis thereof.

4. Apparatus as defined in claim 3, in which said elongated means is composed of two juxtaposed cylindrically-shaped members, in which said pivotal means supports said members for movement about the longitudinal axis of one of said members, and in which the other of said members moves in a translatory fashion about such longitudinal axis, said other member having provided thereon said first glass sheet forming surface.

5. Apparatus as defined in claim 3, in which said elongated means is constituted of a single member having a substantially oval cross-sectional area, said first glass sheet forming surface being formed on one side of said single member.

6. Apparatus as defined in claim 1, in which the opposed surfaces of said fixed transverse portions form guideways for said elongated means, and in which said elongated means comprises a bar having greater width than thickness and slidably mounted between said opposed guideway surfaces, said first glass sheet forming surface being formed on the upper longitudinal edge of said bar.

7. Apparatus as defined in claim 1, in which said fixed transverse portions are joined at their lower ends by a base member forming therewith a transverse chamber which is closed at its top by said elongated means.

8. Apparatus as defined in claim 7, including means located in said chamber for supplying heat thereto.

References Cited

UNITED STATES PATENTS

| 1,538,229 | 5/1925 | Weaver | 65—324 |
| 1,616,370 | 2/1927 | Howard | 65—101 |
| 1,646,705 | 10/1927 | Peiler | 65—324 |
| 1,800,909 | 4/1931 | Shuman | 65—324 |
| 2,003,289 | 6/1935 | Gelstharp et al. | 65—90 |

FOREIGN PATENTS 518,415  2/1940  Great Britain.

DONALL H. SYLVESTER, *Primary Examiner.*

G. R. MYERS, *Assistant Examiner.*